June 21, 1960   C. F. HOFMANN   2,941,905
FILLED ORGANOPOLYSILOXANE COATING FOR ELECTRICAL MEMBERS
Filed April 5, 1957

WITNESSES:
Bernard R. Gieguey
Leon M. Garman

INVENTOR
Charles F. Hofmann
BY William G. Goddard
ATTORNEY

United States Patent Office 2,941,905
Patented June 21, 1960

2,941,905

FILLED ORGANOPOLYSILOXANE COATING FOR ELECTRICAL MEMBERS

Charles F. Hofmann, Wilkinsburg, Pa., assignor to Westinghouse Electric Corporation, East Pittsburgh, Pa., a corporation of Pennsylvania Filed Apr. 5, 1957, Ser. No. 651,086

3 Claims. (Cl. 117—232)

The present invention relates to electrical members and has particular reference to electrical members provided with insulation comprising mixtures of certain organopolysiloxane resins in combination with specific finely divided inorganic fillers, and to processes for producing such members.

In the electrical industry, it is desirable to insulate electrical members by enclosing them completely in resinous compositions. To be completely satisfactory, such resinous compositions must be adaptable for molding, potting, casting, and the like about the members. Moreover, the compositions should be curable to tough, durable products which are capable of withstanding cycling over a relatively wide temperature range for long periods of time without cracking or separating from the electrical members. This cracking tendency increases rapidly with the size of the members, and the thickness of the metal components embedded therein.

In copending application Serial No. 515,259, which application is assigned to the assignee of the present invention, a new class of silicone compounds is disclosed. Those silicone compounds may be used alone, i.e., they do not have to be mixed with or dissolved in a solvent before use. Such silicone compounds, prior to curing, are low viscosity liquids which are particularly suitable for use as impregnating resins in the insulating of coils, transformers, and like electrical apparatus.

The surprising discovery has now been made that the low viscosity liquid solventless silicone compositions disclosed in the said copending application, when modified and employed in combination with critical amounts of certain finely divided inorganic fillers as herein described, provide a resin-filler mixture which is outstandingly well suited both for impregnating and encapsulating relatively large electrical members. Such composite mixtures do not crack during curing and withstand thermal cycling without developing any cracks, even in heavy sections. Furthermore, the finished electrical members are capable of long-life operation at temperatures up to 200° C.

The object of the present invention is to provide a process for insulating electrical members with a specific liquid organopolysiloxane composition containing certain finely divided inorganic fillers.

Another object of the present invention is to provide electrical members having a tough, form-fitting exterior insulating coating, the insulating coating comprising a cured mixture of a specific organopolysiloxane resin in combination with certain finely divided inorganic fillers.

Other and further objects of the invention will, in part, be obvious and will, in part, appear hereinafter.

In order to indicate even more fully the advantages and capabilities of the present invention, reference is made to the following description taken in conjunction with the accompanying drawing, wherein.

Figure 1:
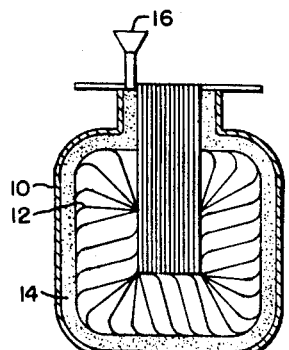
Fig. 1 is a view in elevation, partly in section, illustrating apparatus including a mold suitable for use in the application of the resinous compositions of this invention to a transformer.

In the attainment of the foregoing objects and in accordance with one aspect of the present invention, there is provided a process for applying an insulating composition to electrical members.

Broadly, the process includes the steps of (1) positioning the electrical member in a mold of a design suitable for maintaining the member in a desired position during the subsequent application of the insulating composition. Thereafter, (2) divided inorganic filler is introduced into the mold in an amount sufficient to fill all the open spaces in the electrical member and substantially fill the mold. The mold then (3) is impregnated with a liquid completely reactive organopolysiloxane having a composition which will be described more fully hereinbelow. The siloxane composition has a low viscosity whereby it penetrates between the filler particles and completely fills the mold. The cast electrical member then (4) is placed in an oven or heating device, or current passed through the member, to bring it to a temperature and for a period of time sufficient to cure the organopolysiloxane resin composition to a tough solid. The resultant electrical member thus is provided with both impregnating and encapsulating insulation.

The finished insulated electrical member of this invention may contain the finely divided inorganic filler in amounts from about 70% to 90% by weight, based upon the total weight of the insulating composition, the remaining 30% to 10% comprising the organopolysiloxane composition to be described. It was surprising to discover that the impregnating and encapsulating composition of this invention, containing this relatively large amount of filler, could be cured at relatively high temperatures, e.g., on the order of 200° C. without cracking, even in relatively heavy sections.

Furthermore, it was surprising to discover that the finished electrical member did not develop cracks or other mechanical defects even after being subjected to repeated thermal shocks by cycling at temperatures ranging from 85° C. to —55° C.

The filler material employed in accordance with this invention comprises at least one inert, finely divided non-friable, inorganic filler selected from the group consisting of silica, silicates, alumina, and hydrated alumina. Specific examples of such fillers include sand, porcelain, aluminum silicate, magnesium silicate, glass, aluminum oxide in the form of its mono-, di-, or trihydrate, and the like. These filler materials may be used singly or in any combination of two or more. Satisfactory, crack-free insulation is obtained in accordance with this invention only when these filler materials are employed in a size such that substantially all the particles will pass through a sieve having from 8 to 10 meshes per lineal inch and substantially all will be retained on a sieve having 30 meshes per lineal inch. It is essential that the particles be rigid and non-friable whereby they will not break up into smaller particles during use, since particles of a size outside the above-mentioned range do not produce satisfactory crack-free insulation. Excellent results have been obtained using smooth-surfaced particles free from sharp points.

The completely reactive liquid organopolysiloxane composition employed in this invention comprises a mixture of siloxanes, at least 10% and no more than 50% by weight of which is a low viscosity organopolysiloxane which is described fully in copending application Serial No. 515,259. The low viscosity organopolysiloxane has the following structural formula:

(1) 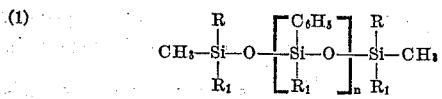

wherein R represents a monovalent radical selected from the group consisting of alkyl radicals having no more than four carbon atoms and aryl radicals comprising a benzene ring with no more than two methyl groups substituted for hydrogen, $R_1$ represents a monovalent radical selected from the group consisting of vinyl and methyl radicals, there being at least two vinyl radicals per molecule, and $n$ is at least two. When $n$ has an average value of from 2 to 10, the viscosity of the liquid siloxane varies from about 0.10 to 1 poise at 25° C. The most thermally stable and lowest viscosity polysiloxane fluids are obtained when R is a methyl radical in Formula (1) above.

The siloxane compounds wherein $n$ is 1 in the above Formula (1) are quite volatile. When coils, for example, are impregnated with such polysiloxanes and then heated to 100° C. to 140° C., copious fumes and vapors of the latter compounds are evolved. Siloxane compounds wherein $n$ is 2, in Formula (1) above, exhibit a marked decrease in vapor pressure as compared to the compounds wherein $n$ is 1; for instance, they will not boil at 85° C. to 100° C. even at pressures of 0.1 mm. Hg. Consequently, it is preferred to carry out the reactions to produce a minimum of siloxane compounds wherein $n$ is 1. If there is present more than a few percent by weight of siloxane compounds wherein $n$ equals 1, they can be and should be separated by fractional distillation. Small quantities of trisiloxane compounds can be present in the compositions for some uses, particularly if two vinyl groups are present per molecule.

Particularly good siloxanes are those having the following formula:

(2) 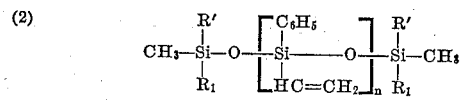

where R' represents a monovalent radical selected from the group consisting of methyl and phenyl radicals and $R_1$ represents a monovalent radical selected from the group consisting of methyl and vinyl radicals, there being an average of at least two vinyl radicals per molecule, and $n$ is at least two.

Especially low viscosity siloxane fluids comprise those having the following formula:

(3) 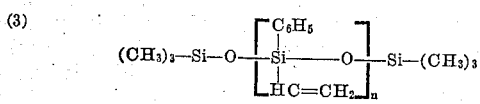

where $n$ is at least 2 and has an average value of from 2 to 10.

Fluids corresponding to Formula (1), which have a viscosity of from approximately 10 to 40 centipoises at 25° C., are obtained when $n$ in Formula (1) has an average value of from 2.0 to 3.5. In Formula (3), when $n$ has an average value of 2.5, the viscosity of the fluid is approximately 15 centistokes at 25° C., and when $n$ has an average value of 3, the viscosity is approximately 20 centistokes at 25° C.

Low viscosity polysiloxane liquids which are suitable for use in the present invention, for example those of Formula (3), may be prepared by hydrolyzing (a) from 2 to 10 mols, or more, of a phenylvinylsilane monomer in which the remaining two groups attached to silicon comprise readily hydrolyzable radicals such as chlorine, fluorine, alkoxy or aryloxy radicals such as, for example, methoxy, ethoxy or phenoxy, or an amine group with (b) two mols of an end blocking agent such as, for example, a silane monomer having only one readily hydrolyzable group attached to silicon, the other radicals attached to silicon being selected from the group consisting of methyl, phenyl, and vinyl radicals, there being not more than one phenyl or more than one vinyl radical on such monomer. The mixture is hydrolyzed with water or an aqueous acid, such as 5% or 20% sulfuric acid. The hydrolyzate is condensed with an acid or an alkali to yield the siloxane. The hydrolysis and condensation of the mixture may be carried out simultaneously. One mol of a disiloxane may be substituted for each two mols of the (b) silane to furnish end blocking groups by cleavage of the disiloxane by an acid condensation catalyst. In such disiloxanes there are six hydrocarbon radicals attached to the two silicon atoms, there being at least one methyl radical on each of the silicon atoms, and not exceeding one phenyl and one vinyl radical on each of the silicon atoms. Examples of such disiloxanes are hexamethyl disiloxane, vinylpentamethyldisiloxane and divinyltetramethyldisiloxane.

Polysiloxane compositions within the scope of Formula (1) may be employed alone for impregnating electrical members. However, they cure into hard and relatively brittle resinous solids. More flexible and tougher solids are obtained if the low viscosity polysiloxane compositions within the scope of Formula (1) are admixed with compatible more viscous, long chain polysiloxane liquids having reactive >C=C< groups, such as vinyl, allyl and methallyl groups attached to silicon by carbon-silicon bonds. To provide compositions which do not crack on curing or during use it is critical, in accordance with the present invention to use a mixed liquid polysiloxane composition comprising (a) at least 10% but not more than 50% by weight of a polysiloxane within the scope of Formula (1), of a viscosity of less than one poise, and preferably below 50 centipoises, at 25° C. and (b) the balance, from 90% to 50% by weight, of long chain polysiloxanes having >C=C< groups and of a viscosity of above 1 poise, and preferably above 10 poises, at 25° C.

The following examples illustrate the preparation of long chain, high viscosity organopolysiloxanes which may be admixed with the siloxanes of Formula (1) above.

EXAMPLE I

A polysiloxane liquid was prepared as follows: A mixture of 37.5 parts of diethoxyphenylvinylsilane, 30 parts of diethoxydimethylsilane and 81.2 parts of 1.4-bis-(ethoxydimethylsilyl)benzene was dissolved in about 165 parts of benzene contained in a vessel. The vessel was placed in an ice bath and cooled to 0° C. The solution was hydrolyzed by adding about 100 parts of 80% sulfuric acid while stirring vigorously over a period of about one hour. The solution was removed from the ice bath and stirred for an additional hour, crushed ice being added near the end. The benzene solution containing the condensate was permitted to separate out and the acid-water layer was discarded. Free acid was washed from the benzene solution by treatment with sodium bicarbonate. Water and benzene were then removed by evaporation using heat and vacuum, leaving about 80 parts of a polymerizable intermediate organosiloxane fluid having a viscosity of 6 poises at 25° C.

EXAMPLE II

An organopolysiloxane was prepared by hydrolyzing a toluene solution of 4 mols of dichlorophenylvinylsilane and 6 mols of dichloromethylphenylsilane with ice water. The toluene solution of this hydrolyzate then was refluxed for several hours in the presence of KOH or other strong alkali. The alkali was then neutralized by shaking with dilute hydrochloric acid. The viscosity of the resulting siloxane was 13 poises at 25° C.

The polysiloxane compositions employed in this invention may be cured to solid polymers by heating the same in the presence of at least one acyl peroxide catalyst. Examples of such peroxides include benzoyl peroxide, benzoyl acetyl peroxide, dicumyl peroxide, dinaphthoyl peroxide, and benzoyl lauryl peroxide. The acyl radical in such peroxides may contain an inorganic substituent, such as, for example, a halogen or a nitro group. The amount of acyl peroxide employed to convert the siloxanes to solid polymers ordinarily need not exceed 10% of the weight of the silicone, with 2% to 4% generally being sufficient.

The siloxanes also may be cured to solid polymers by heating or irradiating with actinic or ultra-violet radiation, particularly when the compositions have been admixed with one of the catalysts just described. Under these conditions, such catalysts may be employed in an amount of from 0.1% to 2% by weight, although somewhat larger or smaller amounts may be employed if desired. Furthermore, polymerization accelerators such as driers, for instance cobalt naphthenate, may be added with such catalysts in an amount of from about 0.01% to 0.05% by weight.

The siloxanes may be cured, in the absence of any added catalyst, by subjecting them to either ultra-violet light or radiation of higher frequency, including gamma rays or electron beam radiation, which latter may be obtained from a Van de Graaff generator or from a radioactive material such as radioactive cobalt which will supply electrons and gamma rays thereto. The compositions may be subjected to electron beam radiation of at least 0.05 m.e.v. to apply from 2 to 50 mega REP to produce solid polymers.

The invention now will be described with particular reference to the casting of a transformer in accordance with the procedure of the present invention. It will be understood, of course, that other electrical members may be insulated in a similar manner.

Looking first at Fig. 1 there is illustrated a split mold 10 of a design suitable to maintain therein a transformer 12 in a desired position during the application thereto of the casting composition of the present invention. Split mold 10 may be made from two or more portions which may be fastened together temporarily by suitable means. The mold parts may be made of aluminum, iron, steel, plastic or like material capable of withstanding prolonged heating at temperatures up to at least 200° C.

Finely divided filler, such as flint particles 14, of a size sufficient to pass through a sieve having 10 meshes per lineal inch but not through one having 30 meshes per lineal inch, is introduced into the mold 10 through a funnel 16. The flint filler 14 is introduced into mold 10 in a quantity sufficient to fill all the interstices and spaces within the interior of the transformer 12 and completely fill mold 10.

The mold preferably is placed on a suitable vibrating device (not shown) and vibrated for a few minutes to insure settling of the flint particles so as to fill all the spaces. Thereafter, additional shot 14 is introduced as required into the mold 10 to insure complete filling of the mold. If desired, the mold also may be placed under vacuum to remove substantially all air from between the particles to further insure the most complete filling of the space between the transformer 12 and mold 10 with shot particles.

Figure 2:
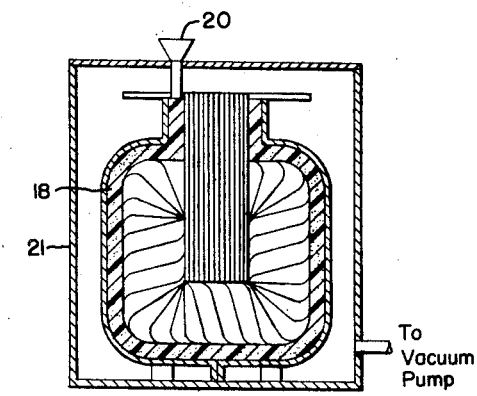
Fig. 2 is a similar view illustrating the vacuum impregnation of the mold and transformer with the liquid, low-viscosity organopolysiloxane resin composition of this invention.

Looking next at Fig. 2, a quantity of the organopolysiloxane resin composition 18, described in Example III below, then is introduced into the mold through a funnel 20. The organopolysiloxane composition 18 has a viscosity low enough to permit its penetration between the particles of flint 14 and completely fill all the spaces within transformer 12 and about the exterior of the transformer 12 within the mold 10. The mold is placed in a vacuum chamber 21 which is evacuated to an absolute pressure of from 4 to 20 millimeters of mercury during the resin impregnation for a period of time until all resin bubbling at the top of the mold ceases. The vacuum then is released and excess resin is drawn off from the top of the mold.

Figure 3:
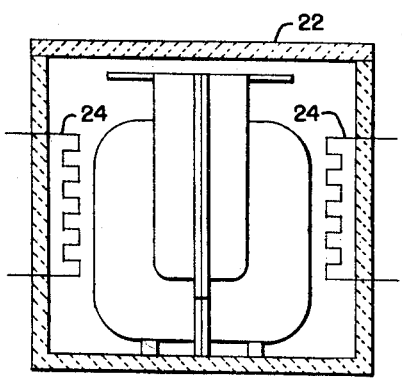
Fig. 3 is a view in elevation, partly in section, illustrating apparatus suitable for use in curing the siloxane resin applied to the transformer.
Figure 4:
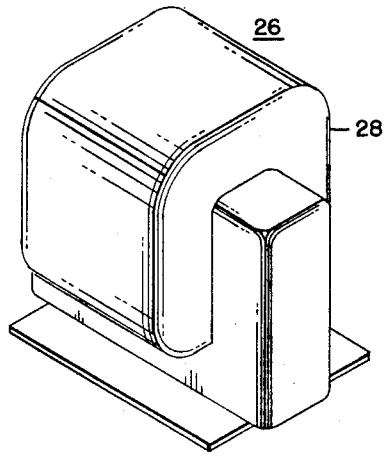
Fig. 4 is a perspective view of a finished transformer cast within the resinous composition of the present invention.

The resin impregnated mold then is placed in an oven 22 provided with heating elements 24, as illustrated in Fig. 3, and maintained therein at a temperature of about 135° C. to 150° C. for eight hours followed by an additional eight-hour bake at about 200° C. Thereafter, the mold parts are separated from the cured electrical transformer. Upon removal from the mold 10, as illustrated in Fig. 4, a finished transformer 26 is obtained having a completely impregnated interior and a fully encapsulating covering 28.

To illustrate the invention even more fully, the following specific examples are set forth.

EXAMPLE III

A transformer is insulated by placing the same in a mold in the manner illustrated in the accompanying drawing. The transformer is provided with an insulating composition comprising about 85% by weight of flint shot of a particle size such that it passes through a screen having 10 meshes per lineal inch but does not pass through a screen having 30 meshes per lineal inch. After the shot is introduced into the mold about the transformer the mold is placed in a suitable 60-cycle vibrating device and vibrated for a period of 5 minutes to insure settling of the flint within the interior of the transformer. Additional flint then is poured into the mold, with vibration, in a quantity sufficient to raise the level of the flint up to the top of the mold. The mold then is placed under a vacuum of 4 to 8 millimeters of mercury for four hours to insure the removal of substantially all of the air from between the particles of shot.

While still in the mold, the transformer is vacuum impregnated with an organopolysiloxane resin composition catalyzed with 1% by weight of dicumyl peroxide. The resin penetrates between the grains of shot, completely impregnates the transformer and forms an encapsulating covering thereabout as defined by the inner wall of the mold. The resin impregnation is carried out under a vacuum of 4 to 8 millimeters of mercury until all air has been removed from the mold, as evidenced by the cessation of resin bubbling at the top of the mold. The vacuum then is released and excess resin is drawn from the top of the mold. The mold then is placed in an air circulating-oven for eight hours at 150° C. followed by an additional eight-hour cure therein at 200° C. No cracks appeared in the surface of the encapsulating coating during the cure of the resin composition. The finished transformer was approximately six inches by six inches by eight inches and had an average thickness of approximately ¼ inch.

The insulation resistance of this transformer then was determined before, during and after a humidification test, a thermal shock test, and a second humidification test. In the first humidification test, the transformer was cycled ten times from 25° C. at 50% relative humidity to 65° C. at 95%–100% relative humidity, over a period of 24 hours. At the end of this humidification test, the transformer was placed in an oven maintained at a temperature of 100° C. for 50 hours to check the recovery of its insulation resistance. In Table I there is set forth the insulation resistance, in megohms, of the transformer measured between each pair of three pairs of windings and between each of the pair of windings and ground before the humidification test, after the fifth and tenth cycles thereof, and after the recovery period.

Table I

| Windings Tested | Insulation Resistance (Megohms) | | | |
|---|---|---|---|---|
| | Before | After 5th Cycle | After 10th Cycle | Recovery |
| 1 vs. 2 | 24,000 | 900 | 69 | 27,000 |
| 1 vs. 3 | 16,000 | 820 | 52 | 19,000 |
| 2 vs. 3 | 13,000 | 135 | 18 | 18,000 |
| 1 vs. Grd | 95,000 | 850 | 66 | 5,600 |
| 2 vs. Grd | 29,000 | 290 | 32 | 4,900 |
| 3 vs. Grd | 19,000 | 2.5 | 19 | 4,100 |

The transformer then was subjected to thermal shock by cycling it 10 times from a temperature of 85° C. to a temperature of —55° C. In Table II there is set forth the insulation resistance, in megohms, of the transformer before and after the thermal shock test.

Table II

| Windings Tested | Insulation Resistance (Megohms) | |
|---|---|---|
| | Before | After |
| 1 vs. 2 | 22,400 | 7,500 |
| 1 vs. 3 | 24,000 | 24,000 |
| 2 vs. 3 | 19,800 | 15,700 |
| 1 vs. Grd | 15,500 | 40,000 |
| 2 vs. Grd | 7,600 | 27,000 |
| 3 vs. Grd | 20,000 | 16,000 |

The transformer then was subjected to a second humidification test similar to the first humidification test described hereinabove. In Table III there is set forth the insulation resistance, in megohms, of the transformer measured immediately before the second humidification test, after the fifth and tenth cycles of that test, and after the transformer had been dried for 50 hours at 100° C. to determine the recovery of its insulation resistance.

Table III

| Windings Tested | Insulation Resistance (Megohms) | | | |
|---|---|---|---|---|
| | Before | After 5th Cycle | After 10th Cycle | Recovery |
| 1 vs. 2 | 14,200 | 400 | 1.05 | 10,800 |
| 1 vs. 3 | 36,000 | 410 | 1.6 | 30,000 |
| 2 vs. 3 | 20,100 | 380 | 1.05 | 42,000 |
| 1 vs. Grd | 30,000 | 100 | 3.4 | 14,500 |
| 2 vs. Grd | 50,000 | 120 | 4.6 | 16,500 |
| 3 vs. Grd | 37,000 | 700 | 2.45 | 15,000 |

EXAMPLE IV

A transformer is prepared in the manner described in Example I with the exception that in this example flint shot is used which is of a size such that it will pass through a sieve having 5 meshes per lineal inch but not through a sieve having 10 meshes per lineal inch. This composition cracks during the subsequent curing step.

Similarly, when Example I is repeated using flint shot of a particle size such that substantially all the particles pass through a sieve having 30 meshes but not through a sieve having 40 meshes per lineal inch, the insulation cracks during the heat cure step.

The compositions of this invention may be used in molding, casting or potting electrical members other than transformers. Thus, they may be used in the manufacture of electrical bushings and to insulate solenoid coils, pulse transformers, electrical reactors, and the like. In some cases the compositions of this invention may be cast into metallic enclosures which are left in place about the electrical member.

While the present invention has been described with respect to what are at present considered to be preferred embodiments thereof, it will be understood, of course, that certain changes, substitutions, modifications, and the like may be made therein without departing from its true scope.

I claim as my invention:

1. An insulated electrical member comprising, in combination, an electrical conductor and a layer of solid insulation applied to said electrical conductor, the solid insulation comprising from 70% to 90% by weight of a finely divided inorganic filler and from 30% to 10% by weight of a cured organopolysiloxane resin, the filler comprising at least one inert, non-friable inorganic compound selected from the group consisting of silica, silicates, alumina, and hydrated alumina and being of a size such that the particles will pass through a sieve having 8 to 10 meshes per lineal inch and substantially all will be retained on a sieve having 30 meshes per lineal inch, and said organopolysiloxane resin comprising a mixture of (a) at least 10% and no more than 50% by weight of a siloxane having the formula

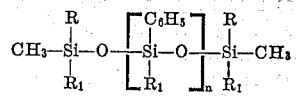

wherein R represents at least one monovalent organic radical selected from the group consisting of alkyl radicals having not more than four carbon atoms and phenyl, tolyl, and xylyl radicals, $R_1$ represents at least one monovalent organic radical selected from the group consisting of methyl and vinyl groups, and n is at least two and has an average value of from 2 to 10, said (a) siloxane having a viscosity of less than 1.0 poise, and the balance, comprising from 90% to 50% by weight of the composition, being (b) at least one compatible hydrocarbon substituted siloxane having a viscosity of substantially more than 1.0 poise and having about 2 hydrocarbon groups per silicon atom attached to silicon by C to Si bonds, the said (b) siloxane having at least one ethylenic group per molecule attached directly to silicon by a C to Si bond, said ethylenic group being selected from the group consisting of vinyl, allyl, and methallyl radicals and at least 50 percent of the radicals directly attached to silicon, other than oxygen and residual hydroxyl groups directly attached to silicon, consisting of at least one radical selected from the group consisting of methyl and phenyl radicals, the mixed organopolysiloxanes (a) and (b) having been polymerized to a tough solid by heating the same to a temperature of about 200° C. in the presence of a polymerization catalyst.

2. An insulated electrical member comprising, in combination, an electrical conductor and a layer of solid insulation applied to said electrical conductor, the solid insulation comprising from 70% to 90% by weight of a finely divided inorganic filler and from 30% to 10% by weight of a cured organopolysiloxane resin, the filler comprising at least one inert, non-friable inorganic compound selected from the group consisting of silica, silicates, alumina, and hydrated alumina and being of a size such that the particles will pass through a sieve having 8 to 10 meshes per lineal inch and substantially all will be retained on a sieve having 30 meshes per lineal inch, and said organopolysiloxane resin comprising a mixture of (a) at least 10% and no more than 50% by weight of a siloxane having the formula

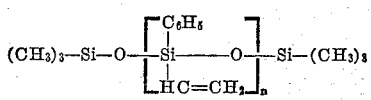

where n is at least 2 and has an average value of from 2 to 10, said (a) siloxane having a viscosity of less than 1.0 poise, and the balance, comprising from 90% to 50% by weight of the composition, being (b) at least one compatible hydrocarbon substituted siloxane having a viscosity of substantially more than 1.0 poise and having about 2 hydrocarbon groups per silicon atom attached to silicon by C to Si bonds, the said (b) siloxane having at least one ethylenic group per molecule attached directly to silicon by a C to Si bond, said ethylenic group being selected from the group consisting of vinyl, allyl, and methallyl radicals and at least 50 percent of the radicals directly attached to silicon, other than oxygen and residual hydroxyl groups directly attached to silicon, consisting of at least one radical selected from the group consisting of methyl and phenyl radicals, the mixed organopolysiloxanes (a) and (b) having been polymerized to a tough solid by heating the same to a temperature of about 200° C. in the presence of a polymerization catalyst.

3. An insulated electrical member as set forth in claim 1 in which $R_1$ in brackets in the formula is $H\overset{|}{C}=CH_2$.

References Cited in the file of this patent

UNITED STATES PATENTS

| | | |
|---|---|---|
| 1,947,085 | Hill et al. | Feb. 13, 1934 |
| 2,480,822 | Hyde | Sept. 6, 1949 |
| 2,604,487 | Burkhard | July 22, 1952 |
| 2,646,535 | Coggeshall et al. | July 21, 1953 |
| 2,714,099 | Weyenburg | July 26, 1955 |